United States Patent
Mizusaki et al.

(10) Patent No.: US 10,739,647 B2
(45) Date of Patent: Aug. 11, 2020

(54) SEALANT FOR LIQUID CRYSTAL SEALING, AND LIQUID CRYSTAL DISPLAY DEVICE

(71) Applicant: SHARP KABUSHIKI KAISHA, Sakai, Osaka (JP)

(72) Inventors: Masanobu Mizusaki, Sakai (JP); Hiroshi Tsuchiya, Sakai (JP); Kenya Ito, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/779,665

(22) PCT Filed: Nov. 24, 2016

(86) PCT No.: PCT/JP2016/084691
§ 371 (c)(1),
(2) Date: May 29, 2018

(87) PCT Pub. No.: WO2017/094572
PCT Pub. Date: Jun. 8, 2017

(65) Prior Publication Data
US 2018/0371302 A1    Dec. 27, 2018

(30) Foreign Application Priority Data
Dec. 1, 2015   (JP) .................. 2015-235205

(51) Int. Cl.
*G02F 1/1339*   (2006.01)
*C08F 2/50*     (2006.01)
(Continued)

(52) U.S. Cl.
CPC ............. *G02F 1/1339* (2013.01); *C08F 2/50* (2013.01); *C09K 3/10* (2013.01); *G02F 1/1337* (2013.01);
(Continued)

(58) Field of Classification Search
CPC ... G02F 1/1339; G02F 1/133788; C09K 3/10; Y10T 428/1014; Y10T 428/1068
See application file for complete search history.

(56) References Cited

U.S. PATENT DOCUMENTS

2002/0163614 A1* 11/2002 Hinata ............... G02F 1/1339
                                                    349/139
2006/0004140 A1*  1/2006 Asano ................ C08F 283/10
                                                    525/31
(Continued)

FOREIGN PATENT DOCUMENTS

JP    2004-004612 A    1/2004
JP    2004004612 A  *  1/2004
(Continued)

*Primary Examiner* — Sophie Hon
(74) *Attorney, Agent, or Firm* — ScienBiziP, P.C.

(57) ABSTRACT

The present invention aims to provide a sealant for sealing liquid crystal and a liquid crystal display device, which can sufficiently reduce image sticking and stains at the periphery of a liquid crystal display. The sealant for sealing liquid crystal of the present invention contains a curable resin and a radical polymerization initiator, wherein the radical polymerization initiator contains a silsesquioxane group. The silsesquioxane group is preferably a group represented by the following formula (I) or (II):

(Continued)

-continued

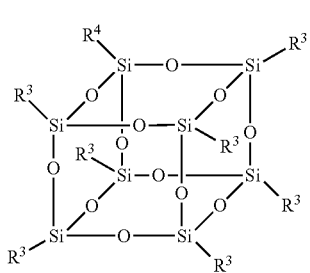

(II)

wherein R¹s are the same as or different from each other and each represent a monovalent organic group; R² represents a divalent linking group; R³s are the same as or different from each other and each represent a monovalent organic group; and R⁴ represents a divalent linking group.

8 Claims, 1 Drawing Sheet

(51) Int. Cl.
*G02F 1/1337* (2006.01)
*C09K 3/10* (2006.01)

(52) U.S. Cl.
CPC .................. *G02F 1/133788* (2013.01); *G02F 2001/133738* (2013.01); *G02F 2001/133742* (2013.01); *Y10T 428/1014* (2015.01); *Y10T 428/1068* (2015.01)

(56) References Cited

U.S. PATENT DOCUMENTS

| | | | |
|---|---|---|---|
| 2009/0176914 A1* | 7/2009 | Gotoh | C09D 11/101 524/105 |
| 2011/0032465 A1* | 2/2011 | Seong | C09K 19/12 349/127 |
| 2012/0142793 A1* | 6/2012 | Frey | C07F 7/21 521/50.5 |
| 2014/0173893 A1* | 6/2014 | Nagao | G02F 1/133788 29/829 |

FOREIGN PATENT DOCUMENTS

| | | |
|---|---|---|
| JP | 2006-023583 A | 1/2006 |
| WO | 2012/077720 A1 | 6/2012 |

\* cited by examiner (I)

(II)

SEALANT FOR LIQUID CRYSTAL SEALING, AND LIQUID CRYSTAL DISPLAY DEVICE

TECHNICAL FIELD

The present invention relates to sealants for sealing liquid crystal, and liquid crystal display devices. More specifically, the present invention relates to sealants for sealing liquid crystal, suitable for use in narrow-frame liquid crystal display devices, and liquid crystal display devices.

BACKGROUND ART

Liquid crystal display devices have rapidly spread in recent years, and are widely employed for not only televisions but also devices such as electronic readers, digital photo frames, industrial appliances, personal computers (PCs), tablet PCs, and smartphones. Such uses require various functions, and various liquid crystal display modes have been developed.

The liquid crystal display modes include a mode in which liquid crystal molecules are aligned in a direction substantially parallel to the main surfaces of the substrates when no voltage is applied (hereinafter also referred to as the "horizontal alignment mode"). Examples thereof include an in-plane switching (IPS) mode and a fringe field switching (FFS) mode. The liquid crystal display modes also include a mode in which liquid crystal molecules are aligned in a direction substantially perpendicular to the main surfaces of the substrates when no voltage is applied (hereinafter also referred to as the "vertical alignment mode"). Examples thereof include a vertical alignment (VA) mode.

Narrower frames are required for liquid crystal display devices, and there is a desire to ensure sufficient reliability of liquid crystal display devices when their frames are made narrow. In order to ensure sufficient reliability, for example, sealants with modified compositions have been disclosed (for example, see Patent Literatures 1 to 3).

CITATION LIST

Patent Literature

Patent Literature 1: JP 2004-4612 A
Patent Literature 2: JP 2006-23583 A
Patent Literature 3: WO 2012/077720

SUMMARY OF INVENTION

Technical Problem

A peripheral portion of a display area (near a sealing member) of a liquid crystal display is more susceptible to stains and image sticking than a central portion thereof. This trend is particularly noticeable with use of a sealant that is UV-light/visible-light curable and also thermally curable.

Stains and image sticking visible at the periphery of liquid crystal displays result from ionization of some components of a sealant which dissolved into the liquid crystal layer. A sealant (in particular, a sealant for one drop fill (ODF) process) mainly contains the following components (1) to (6):
(1) an acrylic monomer or methacrylic monomer;
(2) an acrylic monomer or methacrylic monomer radical polymerization initiator (photopolymerization initiator);
(3) an epoxy monomer (diglycidyl compound);
(4) an epoxy monomer curing agent (diamine curing agent and dihydrazide curing agent are common);
(5) a silane coupling agent (effective in improving adhesion at the interface between an alignment film and a sealing member); and
(6) an organic filler and an inorganic filler (for purposes such as viscosity adjustment).

Among these components (1) to (6), in particular, dissolution of even a small amount of the radical polymerization initiator (2) into the liquid crystal layer generates radicals due to photoexcitation of the radical polymerization initiator by light of a backlight or other outside light during use of liquid crystal displays. Ionization of a portion of the radicals generated causes stains or image sticking at the periphery of the liquid crystal displays. Such stains and image sticking are noticeable with use of a polymerization initiator that easily dissolves in liquid crystal materials or a polymerization initiator that absorbs light even at long wavelengths (e.g., wavelength region of around 400 nm or more). Meanwhile, when forming a polymer layer by a technique such as a photoalignment film (alignment film formed from a polymer having a photofunctional group) technique or a polymer sustained alignment (PSA) technique, it is common to use a polymerization initiator capable of forming radicals relatively at long wavelengths in order to reduce overlap between the absorption wavelength region of a photofunctional group or the like and the wavelength region where the polymerization initiator of the sealant can form radicals.

The present invention was made in view of the current situation described above, and aims to provide a sealant for sealing liquid crystal and a liquid crystal display device which can sufficiently reduce image sticking and stains at the periphery of a liquid crystal display.

Solution to Problem

FIG. 1 is a view showing a silsesquioxane group. The present inventors found to introduce an inorganic functional group with a steric structure as shown in FIG. 1 (silsesquioxane group; herein also referred to as an "SQ group"; $R^1$ and $R^3$ each represent a monovalent organic group; and $R^2$ and $R^4$ each represent a linking group that links to a radical generation site of a radical polymerization initiator) into a radical polymerization initiator by a chemical bond.

The inorganic functional group (SQ group) has a steric structure, and is thus more rigid than linear siloxanes (siloxane oligomer or polysiloxane). Thus, introduction of an SQ group into the radical polymerization initiator by a chemical bond significantly reduces the solubility of the radical polymerization initiator in liquid crystal. This significantly reduces radical generation and ion generation in a liquid crystal layer during use of a liquid crystal display, and reduces stains and image sticking at a periphery of the liquid crystal display, thus increasing the reliability.

In the case of a narrow-frame liquid crystal display having a sealing member width (average width of the sealing member) of 0.6 mm or less, the reliability is easily reduced not only by light but also by moisture permeation (i.e., passage of moisture into a the sealing member, making an intrusion into the liquid crystal layer). In contrast, an SQ group has an effect of inhibiting moisture permeation, owing to the fact that the SQ group itself is an inorganic compound and that the steric structure of the SQ group has an effect of entrapping moisture inside thereof. Thus, introduction of an SQ group into the radical polymerization initiator has an effect of significantly increasing the reliability of the narrow-frame liquid crystal display.

Use of a polysiloxane polymer (for vertical alignment and for horizontal alignment) as an alignment film material reduces the reliability due to moisture permeation from the interface between the sealing member and the alignment film because the adhesive strength between a polysiloxane and conventional sealing members is weak. However, a sealing member containing an SQ group has a high compatibility with a polysiloxane and is capable of increasing the adhesion between the sealing member and the alignment film, thus inhibiting moisture permeation from the interface between the sealing member and the alignment film and allowing a further improvement in the reliability.

The present inventors found that the above problems can be successfully solved by the structure described above, and arrived at the present invention.

Specifically, according to one aspect, the present invention may provide a sealant for sealing liquid crystal containing a curable resin and a radical polymerization initiator, wherein the radical polymerization initiator contains a silsesquioxane group.

According to another aspect, the present invention may provide a liquid crystal display device including: a pair of substrates; a liquid crystal layer disposed between the substrates; an alignment film disposed between at least one substrate and the liquid crystal layer; a sealing member disposed between the substrates at the periphery of these substrates so as to seal the liquid crystal layer; and a backlight, wherein the sealing member is a cured product of the sealant for sealing liquid crystal of the present invention. The term "pair of substrates" refers to a combination of an "upper substrate" and a "lower substrate".

In the invention disclosed in Patent Literature 1 described above, the adhesive strength at the interface between the sealing member and the alignment film is improved by use of a (meth)acrylic monomer or epoxy monomer to which silsesquioxane is chemically bonded.

In contrast, in the present invention, silsesquioxane is chemically bonded to a polymerization initiator that generates radicals, for example, upon exposure to light such as UV light. The present invention is different from the invention disclosed in Patent Literature 1 in which silsesquioxane is bonded to a monomer ((meth)acrylic monomer or epoxy monomer).

In the present invention, silsesquioxane is chemically bonded to a polymerization initiator so as to inhibit dissolution of the polymerization initiator into the liquid crystal layer. In contrast, Patent Literature 1 nowhere mentions dissolution of a polymerization initiator containing a silsesquioxane group that is an inorganic compound and has a steric structure into the liquid crystal layer.

In the present invention, a combination of a sealing member containing a silsesquioxane group and a polysiloxane-based alignment film is particularly preferred. Owing to adhesion improved by this combination, the present invention can inhibit moisture permeation and improve the reliability. In contrast, Patent Literature 2 is silent about a composition of an alignment film for a suitable combination with a sealing member.

In the invention disclosed in Patent Literature 2, with regard to a radical polymerization initiator (photopolymerization initiator) for curing (polymerizing) an acrylic resin to be used in sealants for ODF, a polymerization initiator to which an acrylic group is bonded as represented by formula (3) shown in Patent Literature 2 is mentioned, for the purpose of preventing an unreacted polymerization initiator from remaining in order to prevent reduction in reliability.

In the invention disclosed in Patent Literature 2, in order to prevent a reduction in reliability due to dissolution of an unreacted polymerization initiator into the liquid crystal layer, a polymerizable group is bonded to a polymerization initiator so as to incorporate a polymer into a sealing member. In contrast, in the present invention, in order to prevent dissolution of an unreacted polymerization initiator into the liquid crystal layer, silsesquioxane that is an inorganic compound and that has a steric structure is chemically introduced into a polymerization initiator. The present invention is different in this point from the invention disclosed in Patent Literature 2. In addition, in the invention disclosed in Patent Literature 2, introduction of a polymerizable group so as to incorporate an unreacted polymerization initiator into a polymer is described as design guidelines. Yet, if an unreacted polymerization initiator fails to be incorporated into a polymer by a polymerization reaction, the unreacted polymerization initiator may dissolve into the liquid crystal layer because it is an organic compound and has a highly flexible chemical structure.

The present invention can inhibit moisture permeation and improve the reliability owing to adhesion improved by a combination of a sealing member containing silsesquioxane and a polysiloxane-based alignment film. In contrast, Patent Literature 2 is silent about a composition of an alignment film for a suitable combination with a sealing member.

In the invention disclosed in Patent Literature 3, with regard to a radical polymerization initiator (photopolymerization initiator) for curing (polymerizing) an acrylic resin to be used in sealants for ODF, a polymerization initiator to which a functional group having a low solubility in liquid crystal materials is bonded as represented by formula (3) in Patent Literature 3 is mentioned, for the purpose of preventing a reduction in reliability due to dissolution of an unreacted polymerization initiator into the liquid crystal layer.

In the invention disclosed in Patent Literature 3, a hydrophilic ethylene glycol skeleton having a low solubility in liquid crystal materials is bonded to a radical polymerization initiator in order to improve the reliability.

In the invention disclosed in Patent Literature 3, in order to prevent a reduction in reliability due to dissolution of an unreacted polymerization initiator into the liquid crystal layer, a hydrophilic functional group (ethylene glycol) is bonded to a polymerization initiator so as to reduce the compatibility with the liquid crystal layer. Also in the present invention, a functional group having a low compatibility with liquid crystal is introduced in order to inhibit dissolution of an unreacted polymerization initiator into the liquid crystal layer, but the functional group is silsesquioxane that is an inorganic compound and that has a steric structure, and it is different from the ethylene glycol skeleton disclosed in Patent Literature 3. Although ethylene glycol introduced into a polymerization initiator in Patent Literature 3 is hydrophilic and has a low miscibility with liquid crystal materials, it is a highly flexible organic compound and is thus more soluble in liquid crystal than silsesquioxane, and its effect is considered to be small as compared to silsesquioxane.

The present invention can inhibit moisture permeation and improve the reliability owing to adhesion improved by a combination of a sealing member containing silsesquioxane and a polysiloxane-based alignment film. In contrast, Patent Literature 3 is silent about a composition of an alignment film for a suitable combination with a sealing member. In addition, in the invention disclosed in Patent Literature 3, the sealing member has higher water absorbency due to introduction of hydrophilic ethylene glycol, which unfortunately results in higher moisture permeability (the degree of intrusion of moisture into the liquid crystal layer from outside).

Advantageous Effects of Invention

The sealant for sealing liquid crystal and the liquid crystal display device of the present invention can sufficiently reduce image sticking and stains at the periphery of a liquid crystal display.

DESCRIPTION OF EMBODIMENTS

The present invention is described in more detail in the following embodiments with reference to the drawings, but is not limited to these embodiments. The features of each embodiment may be appropriately combined or modified without departing from the gist of the present invention.

Herein, a mode in which liquid crystal molecules are aligned in a direction substantially parallel to the main surfaces of the substrates when no voltage is applied is also referred to as a horizontal alignment mode. Being substantially parallel means that, for example, the pre-tilt angle of liquid crystal molecules is in the range of 0° to 5° from the main surfaces of the substrates. A mode in which liquid crystal molecules are aligned in a direction substantially perpendicular to the main surfaces of the substrates when no voltage is applied is also referred to as a vertical alignment mode. Being substantially perpendicular means that, for example, the pre-tilt angle of liquid crystal molecules is in the range of 85° to 90° from the main surfaces of the substrates. The room temperature is a temperature in the range of 15° C. to 30° C.

The present invention is applicable to both horizontal alignment mode and vertical alignment mode.

Figure 1:
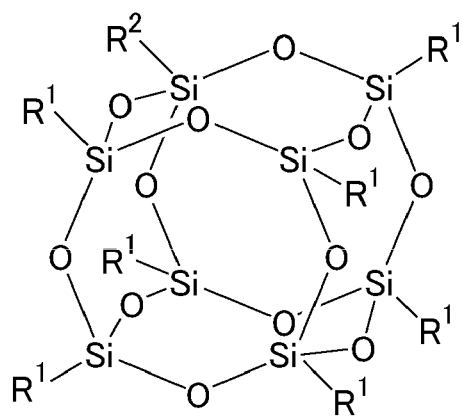
FIG. 1 is a view showing a silsesquioxane group.
Figure 1:
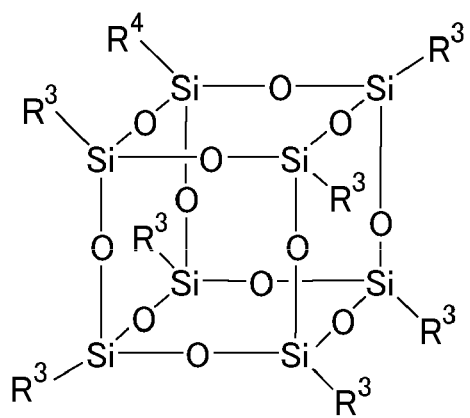
Figure 2:
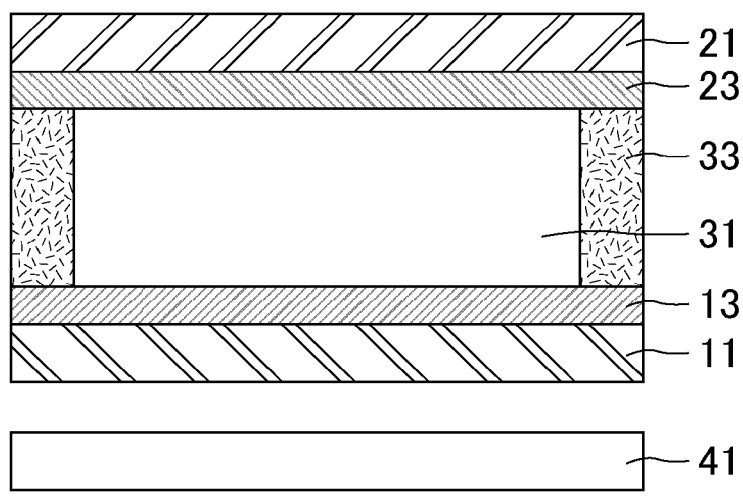
FIG. 2 is a schematic cross-sectional view showing a liquid crystal display device of the present invention.

FIG. 2 is a schematic cross-sectional view showing the liquid crystal display device of the present invention. As shown in FIG. 2, the liquid crystal display device includes a lower glass substrate 11, an upper glass substrate 21 facing the lower glass substrate 11, a liquid crystal layer 31 and a sealing member 33 which are disposed between the substrates, and alignment films 13 and 23. The alignment film 13 is disposed between the lower glass substrate 11 and the liquid crystal layer 31. The alignment film 23 is disposed between the upper glass substrate 21 and the liquid crystal layer 31. The sealing member 33 seals the liquid crystal layer 31. The liquid crystal display device further includes a backlight 41 on the lower side (back side) of the lower glass substrate 11. The liquid crystal display device may further include a pair of polarizing plates, one on the lower glass substrate 11 and the other one on the upper glass substrate 21, on the sides opposite to the liquid crystal layer 31.

The liquid crystal display device of the present invention also includes thin-film transistor elements and the like suitably disposed on the lower glass substrate 11 as a supporting substrate, and further includes a pair of comb-teeth electrodes formed from pixel electrodes and a common electrode in some portions on an insulating film covering the thin-film transistor elements and the like. Indium tin oxide (ITO) or indium zinc oxide (IZO) can be suitably used as a material of the pixel electrodes and the common electrode. The liquid crystal display device of the present invention does not include electrodes on the upper glass substrate 21 as a supporting substrate, but includes components such as a color filter layer (optionally with a black matrix on the same layer) suitably disposed on the glass substrate.

The following describes a preparation example of a radical polymerization initiator for use in the sealant for sealing liquid crystal of the present invention.

(Exemplary Radical Polymerization Initiator Containing a Silsesquioxane (SQ) Group (1))

4,4-Dihydroxybenzyl (1.6 g) and Ce(TfO)$_3$ (0.58 g) were dissolved in methanol (12.8 g), and the temperature of the solution was set to 50° C. Then, trimethyl orthoformate (4.2 g) was dropped into the solution, and the mixture was stirred for 15 hours. Subsequently, the mixture was cooled to 25° C. or lower, triethylamine (5.0 g) was added to the mixture at an internal temperature of 30° C. or lower, followed by stirring for 5 minutes, and methanol as the solvent was removed. Then, acetonitrile (20 g) was added to the resulting residue and dispersed therein. Silsesquioxane (PSS-glycidyl-heptacyclopentyl substituted) having an epoxy group (5.0 g) diluted with acetonitrile (10.0 g) was dropped into the dispersion liquid at 30° C. or lower. After dropping, the temperature was set to 60° C., and the mixture was stirred for two hours. Subsequently, after extraction with toluene (50 g), the extract was washed three times with water (20 g) and washed one time with saturated saline (20 g). Then, methoquinone (5.0 mg) was added to the extract, and the solvent was removed. The resulting residue was purified by column chromatography (ethyl acetate:hexane=1:5) and then dried. Thus, a polymerization initiator (3.38 g) represented by formula (2) was obtained.

[Chem. 1]

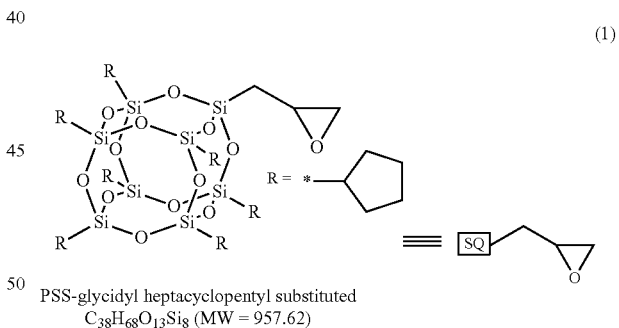

PSS-glycidyl heptacyclopentyl substituted
$C_{38}H_{68}O_{13}Si_8$ (MW = 957.62)

[Chem. 2]

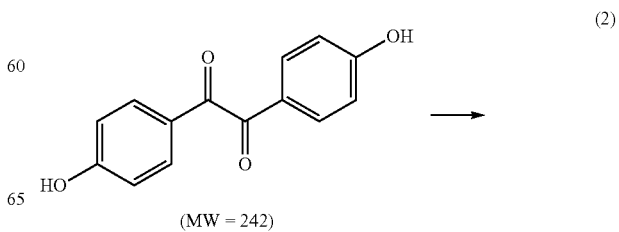

(MW = 242)

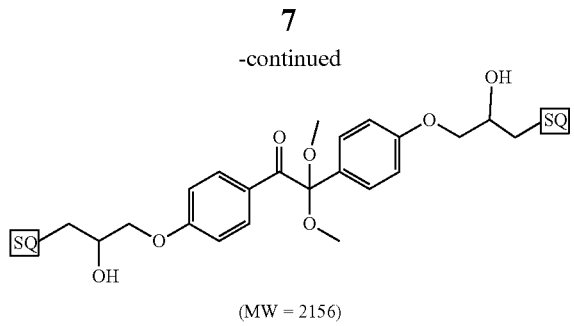

(MW = 2156)

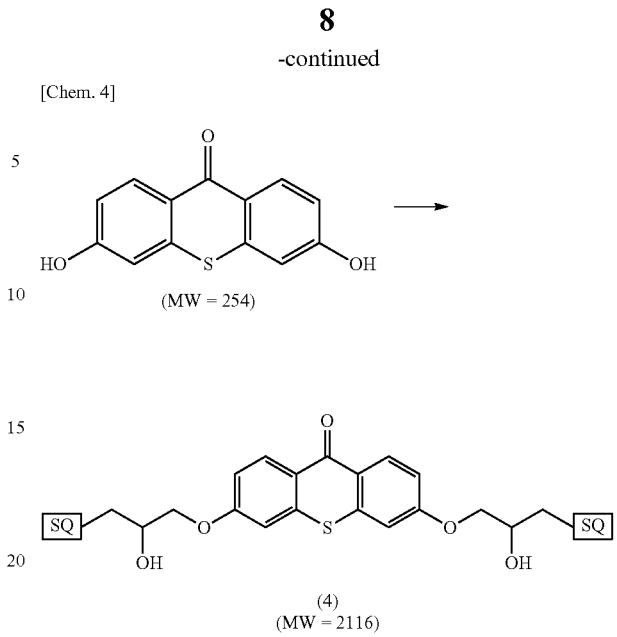

(4)
(MW = 2116)

(Exemplary Radical Polymerization Initiator Containing a Silsesquioxane (SQ) Group (2))

2,7-Dihydroxy thioxanthone (4.0 g) was dissolved in THF (100 g), and silsesquioxane (PSS-(3-glycidyl)propoxy-heptaisobutyl substituted) having an epoxy group (30 g) was dropped into the solution over 30 minutes, followed by stirring at 60° C. for five hours. Subsequently, to the stirred solution was added 1% HClaq (300 g), followed by extraction with methylene chloride (300 g) and washing with water for separation. Then, methylene chloride was removed. Subsequently, silica gel chromatography (ethyl acetate/hexane=1:5) was performed for purification. Thus, a target polymerization initiator (18.3 g) represented by formula (4) was obtained.

[Chem. 3]

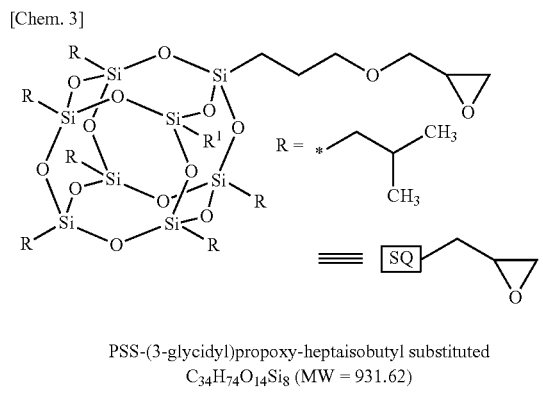

PSS-(3-glycidyl)propoxy-heptaisobutyl substituted
$C_{34}H_{74}O_{14}Si_8$ (MW = 931.62)

(Exemplary Radical Polymerization Initiator Containing a Silsesquioxane (SQ) Group (3))

A polymerization initiator (Irgacure-OXE01) having a hydroxy group (4.6 g) was dissolved in THF (50 g). Silsesquioxane (PSS-(3-glycidyl)propoxy-heptaisobutyl substituted) having an epoxy group (9.5 g) was dropped into the solution over 30 minutes, followed by stirring at 60° C. for five hours. Subsequently, to the stirred solution was added 1% HClaq (300 g), followed by extraction with methylene chloride (300 g) and washing with water for separation. Then, methylene chloride was removed. Subsequently, silica gel chromatography (ethyl acetate/hexane=1:5) was performed for purification. Thus, a target polymerization initiator (8.8 g) represented by formula (5) was obtained.

[Chem. 5]

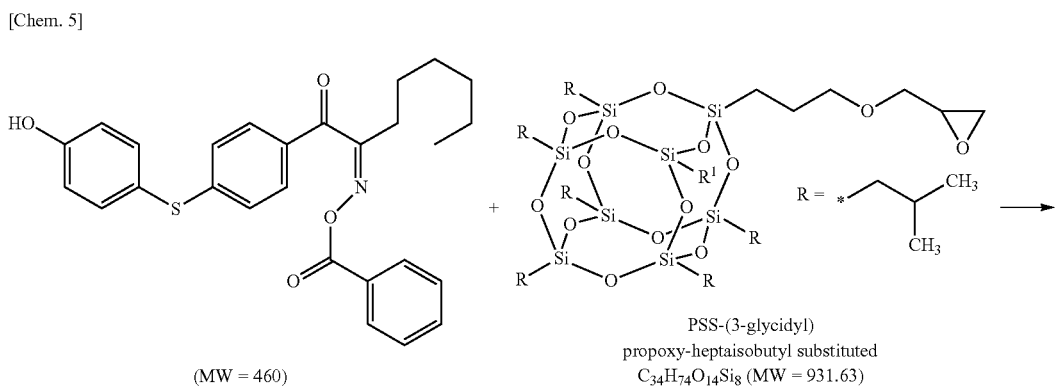

(MW = 460)

PSS-(3-glycidyl)propoxy-heptaisobutyl substituted
$C_{34}H_{74}O_{14}Si_8$ (MW = 931.63)

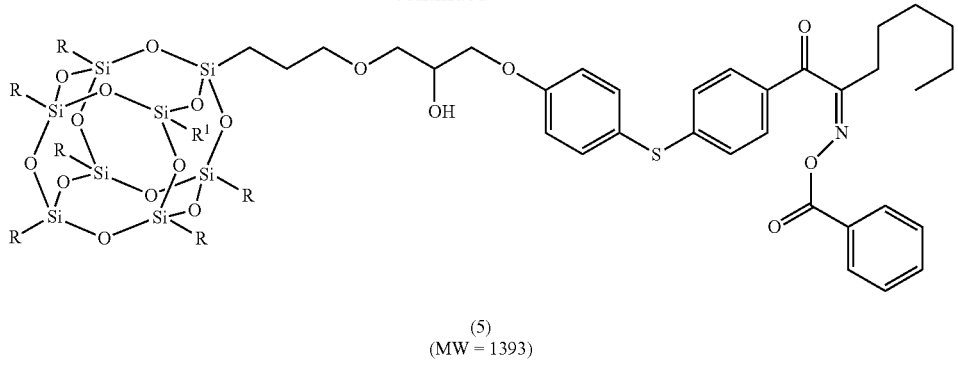

(5)
(MW = 1393)

The sealant for sealing liquid crystal of the present invention contains a curable resin as a resin component. The curable resin is preferably one having an ultraviolet light-reactive functional group and a heat-reactive functional group, and is more preferably one having a (meth)acryloyl group and/or an epoxy group because when the sealant for sealing liquid crystal having a (meth)acryloyl group and/or an epoxy group is used as a sealant for ODF, the curing reaction proceeds quickly and good adhesion can be achieved. Examples of such curable resins include (meth)acrylates and epoxy resins. These resins may be used alone or in combination of two or more thereof.

As used herein, the "(meth)acrylic" refers to acrylic or methacrylic.

The (meth)acrylate is not particularly limited, and examples thereof include urethane (meth)acrylate having a urethane bond and epoxy (meth)acrylate derived from a compound having a glycidyl group and (meth)acrylic acid.

The urethane (meth)acrylate is not particularly limited, and examples thereof include derivatives from diisocyanates such as isophorone diisocyanate and reactive compounds (such as acrylic acid and hydroxyethyl acrylate) that undergo addition reaction with isocyanates. The chains of these derivatives may be extended with caprolactone, a polyol, or the like. Examples of commercial products include U-122P, U-340P, U-4HA, and U-1084A (all available from Shin Nakamura Chemical Co., Ltd.); and KRM7595, KRM7610, and KRM7619 (all available from Daicel-UCB Co., Ltd.).

The epoxy (meth)acrylate is not particularly limited, and examples thereof include epoxy (meth)acrylates derived from epoxy resins (e.g., bisphenol A epoxy resin and propylene glycol diglycidyl ether) and (meth)acrylic acid. Examples of commercial products include EA-1020, EA-6320, and EA-5520 (all available from Shin Nakamura Chemical Co., Ltd.); and Epoxyester 70PA and Epoxyester 3002A (both available from Kyoeisha Chemical Co., Ltd.).

Examples of other (meth)acrylates include methyl methacrylate, tetrahydrofurfuryl methacrylate, benzyl methacrylate, isobornyl methacrylate, 2-hydroxyethyl methacrylate, glycidyl methacrylate, (poly)ethylene glycol dimethacrylate, 1,4-butanediol dimethacrylate, 1,6-hexanediol dimethacrylate, trimethylolpropane triacrylate, pentaerythritol triacrylate, and glycerol dimethacrylate.

Examples of the epoxy resin include phenol novolac epoxy resin, cresol novolac epoxy resin, biphenyl novolac epoxy resin, trisphenol novolac epoxy resin, dicyclopentadiene novolac epoxy resin, bisphenol A epoxy resin, bisphenol F epoxy resin, 2,2'-diallyl bisphenol A epoxy resin, bisphenol S epoxy resin, hydrogenated bisphenol A epoxy resin, propylene oxide-added bisphenol A epoxy resin, biphenyl-type epoxy resin, naphthalene-type epoxy resin, resorcinol-type epoxy resin, and glycidyl amines.

Examples of commercial products of the epoxy resin include NC-3000S (available from Nippon Kayaku Co., Ltd.) for phenyl novolac-type epoxy resin; EPPN-501H and EPPN-501H (both available from Nippon Kayaku Co., Ltd.) for trisphenol novolac epoxy resin; NC-7000L (available from Nippon Kayaku Co., Ltd.) for dicyclopentadiene novolac epoxy resin; Epiclon 840S and Epiclon 850CRP (both available from DIC Corporation) for bisphenol A epoxy resin; Epikote 807 (available from Japan Epoxy Resins Co. Ltd.) and Epiclon 830 (available from DIC Corporation) for bisphenol F epoxy resin; RE310NM (available from Nippon Kayaku Co., Ltd.) for 2,2'-diallyl bisphenol A epoxy resin; Epiclon 7015 (available from DIC Corporation) for hydrogenated bisphenol-type epoxy resin; Epoxyester 3002A (available from Kyoeisha Chemical Co., Ltd.) for propylene oxide-added bisphenol A epoxy resin; Epikote YX-4000H and YL-6121H (both available from Japan Epoxy Resins Co. Ltd.) for biphenyl-type epoxy resin; Epiclon HP-4032 (available from DIC Corporation) for naphthalene-type epoxy resin; DENACOL EX-201 (available from Nagase ChemteX Corporation) for resorcinol-type epoxy resin; and Epiclon 430 (available from DIC Corporation) and Epikote 630 (available from Japan Epoxy Resins Co. Ltd.) for glycidyl amines.

In the sealant for sealing liquid crystal of the present invention, an epoxy-(meth)acrylic resin having at least one (meth)acrylic group and at least one epoxy group in one molecule can also be suitably used as a curable resin.

Examples of the epoxy-(meth)acrylic resin include a compound that can be obtained by partially reacting an epoxy group of the epoxy resin with (meth)acrylic acid in the presence of a basic catalyst according to a usual method; a compound that can be obtained by reacting bi- or higher functional isocyanate (1 mol) with a (meth)acrylic monomer having a hydroxyl group (½ mol) and subsequently with glycidol (½ mol); and a compound that can be obtained by reacting a (meth)acrylate having an isocyanate group with glycidol. Examples of commercial products of the epoxy-(meth)acrylic resin include UVAC1561 (available from Daicel-UCB Co., Ltd.).

The sealant for sealing liquid crystal of the present invention preferably contains a thermal curing agent.

The thermal curing agent allows a heat reactive functional group in the curable resin to react and crosslink by heating, and serves to improve the adhesion and the moisture resistance of the sealant for sealing liquid crystal after curing.

The thermal curing agent is not particularly limited, but preferably contains an amine and/or thiol group having excellent low temperature reactivity in order to effect curing of the sealant for sealing liquid crystal of the present invention at a curing temperature of 100° C. to 120° C. when the sealant is used as a sealant for ODF. Such a thermal curing agent is not particularly limited, and examples thereof include hydrazide compounds (e.g., 1,3-bis(hydradinocarbonoethyl)-5-isopropyl hydantoin] and dihydrazide adipate), dicyandiamide, guanidine derivatives, 1-cyanoethyl-2-phenylimidazole, N-[2-(2-methyl-1-imidazolyl)ethyl]urea, 2,4-diamino-6-[2'-methylimidazolyl-(1')]-ethyl-s-triazine, N,N'-bis(2-methyl-1-imidazolylethyl)urea, N,N'-(2-methyl-1-imidazolylethyl)-adipamide, 2-phenyl-4-methyl-5-hydroxymethyl imidazole, 2-imidazoline-2-thiol, 2-2'-thiodiethanethiol, and adducts between various amines and epoxy resins. These may be used alone or in combination of two or more thereof.

The sealant for sealing liquid crystal of the present invention may contain a silane coupling agent.

The silane coupling agent is not particularly limited. Yet, it is preferably a silane coupling agent containing γ-aminopropyltrimethoxysilane, γ-mercaptopropyltrimethoxysilane, γ-glycidoxy propyltrimethoxysilane, or γ-isocyanatepropyltrimethoxysilane; or a silane coupling agent containing an imidazole silane compound having a structure in which an imidazole skeleton and an alkoxysilyl group are bonded to each other via a spacer group, because the silane coupling agents are highly effective in improving the adhesion with a substrate or the like and can prevent flow-out of the sealant into the liquid crystal materials by forming a chemical bond with the curable resin. These silane coupling agents may be used alone or in combination of two or more thereof.

The sealant for sealing liquid crystal of the present invention may contain a filler for purposes such as improvement in the adhesion by stress dispersion effect and improvement in the coefficient of linear expansion. The filler is not particularly limited, and examples thereof include inorganic fillers such as silica filler, diatomite filler, alumina filler, zinc oxide filler, iron oxide filler, magnesium oxide filler, tin oxide filler, titanium oxide filler, magnesium hydroxide filler, aluminum hydroxide filler, magnesium carbonate filler, barium sulfate filler, gypsum filler, calcium silicate filler, talc filler, glass bead filler, sericite filler, activated clay filler, bentonite filler, aluminum nitride filler, and silicon nitride filler.

The sealant for sealing liquid crystal of the present invention may contain other additives different from those mentioned above. Examples of other additives include a thermal radical polymerization initiator, a gelling agent, and a sensitizer.

The present invention also relates to a liquid crystal display device including: a pair of substrates; a liquid crystal layer disposed between the substrates; an alignment film disposed between at least one substrate and the liquid crystal layer; and a sealing member disposed between the substrates at the periphery of these substrates so as to seal the liquid crystal layer, wherein the sealing member is a cured product of the sealant for sealing liquid crystal of the present invention.

Preferred polymers in the alignment films are described in detail below.

Examples of preferred polymers in the alignment films include a polymer whose main chain is a polysiloxane, a polyamic acid, and a polyimide.

An example of a more specific structure of the polymer whose main chain is a polysiloxane is represented by the following chemical formula (6):

[Chem. 6]

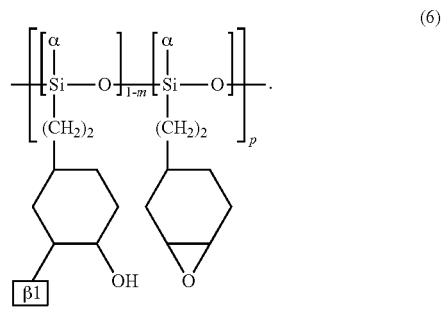

(6)

In the formula, p represents the degree of polymerization and is an integer of 1 or greater, preferably 10 or greater. a is not particularly limited, but represents a hydrogen atom or a monovalent substituent. The substituent is preferably a hydroxyl group, a methoxy group, or an ethoxy group. m is greater than 0 and not greater than 1. β1 is preferably a photoalignment functional group in which at least a portion thereof controls alignment of liquid crystal molecules. While a vertical or horizontal alignment functional group may be additionally introduced thereinto, β1 containing any of monovalent cinnamate groups represented by the following formulas (7-1) to (7-4) are preferred.

[Chem. 7]

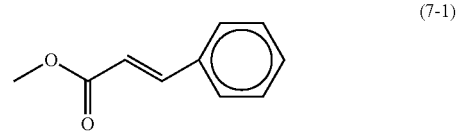

(7-1)

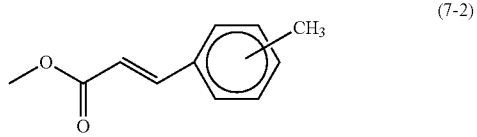

(7-2)

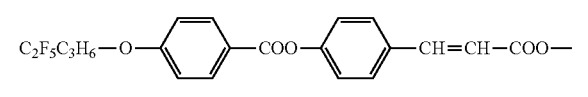

(7-3)

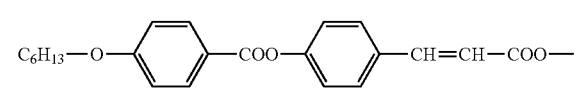

(7-4)

Specific examples of structures of the polyamic acid and polyimide include those represented by the following chemical formulas (8) and (9).

[Chem. 8]

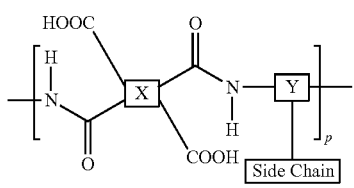
(8)

[Chem. 9]

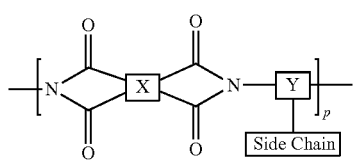
(9)

In each of formulas (8) and (9), p represents the degree of polymerization and is an integer of 1 or greater, preferably 10 or greater.

In each of formulas (8) and (9), the Side Chain represents a photoalignment side chain or a vertical or horizontal alignment side chain. These side chains may be concurrently bonded to one polymer, forming a bipolymer, terpolymer, or tetrapolymer.

In each of formulas (8) and (9), X may represent a tetravalent group represented by any of the following formulas (10-1) or (10-12). These groups can be used for both horizontal alignment films and vertical alignment films.

[Chem. 10]

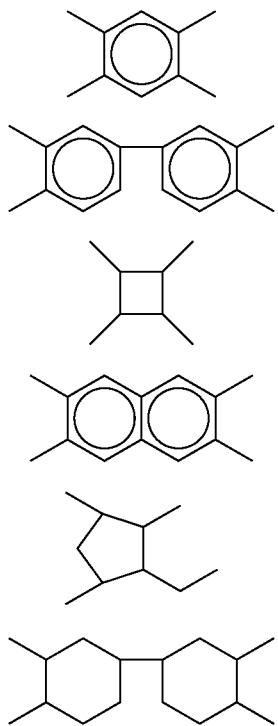

(10-1)
(10-2)
(10-3)
(10-4)
(10-5)
(10-6)

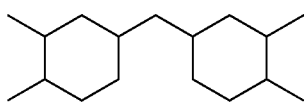
(10-7)

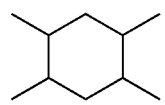
(10-8)

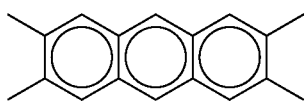
(10-9)

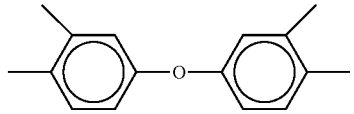
(10-10)

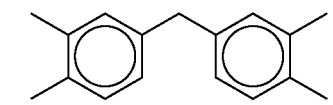
(10-11)

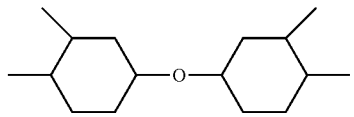
(10-12)

In each of formulas (8) and (9), X may represent a tetravalent group represented by any of the following formulas (11-1) to (11-14). These groups can be used for both horizontal alignment films and vertical alignment films.

[Chem. 11]

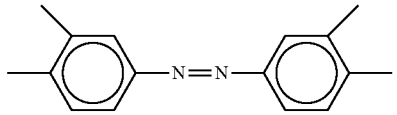
(11-1)

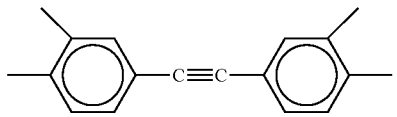
(11-2)

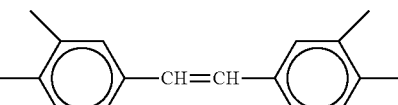
(11-3)

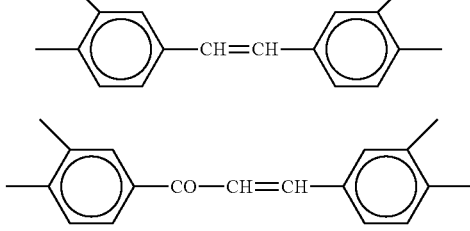
(11-4)

In each of formulas (8) and (9), Y may represent a trivalent group represented by any of the following formulas (12-1) to (12-16). These groups can be used for both horizontal alignment films and vertical alignment films.

[Chem. 12]
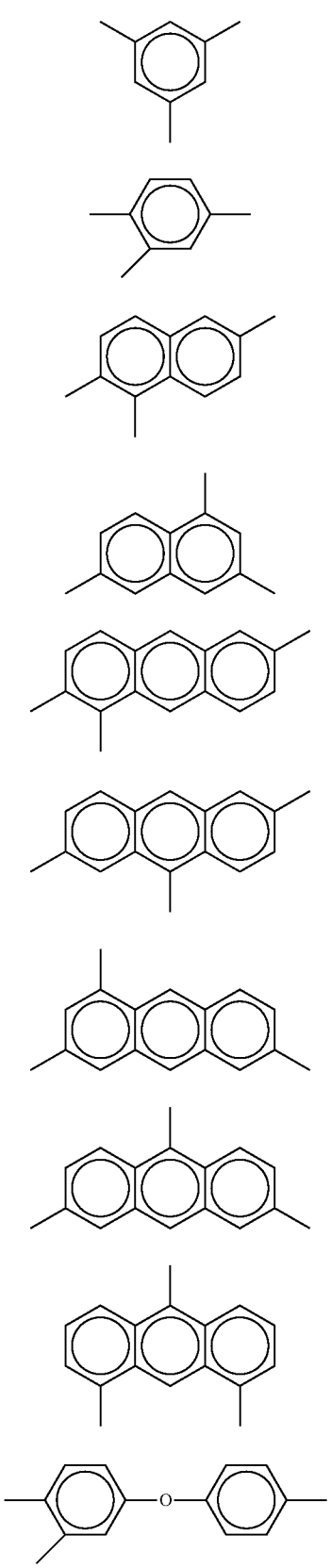
(12-1) (12-2) (12-3) (12-4) (12-5) (12-6) (12-7) (12-8) (12-9) (12-10)
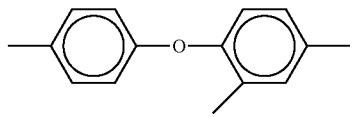
(12-11)
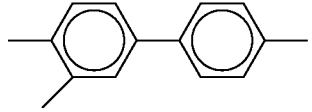
(12-12)
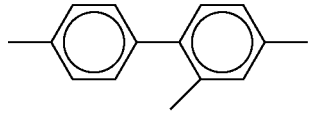
(12-13)
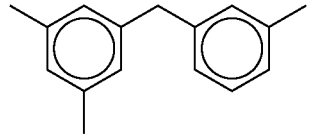
(12-14)
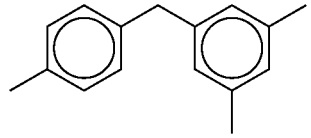
(12-15)
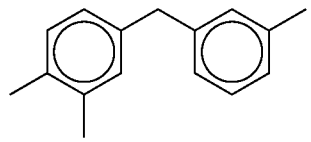
(12-16)
In each of formulas (8) and (9), Y may represent a trivalent group represented by any of the following formulas (13-1) to (13-8). These groups can be used for all of horizontal alignment films, vertical alignment films, horizontal photoalignment films, and vertical photoalignment films.
[Chem. 13]
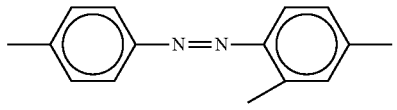
(13-1)
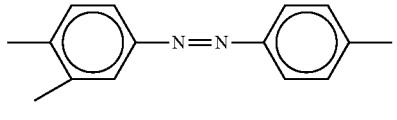
(13-2)
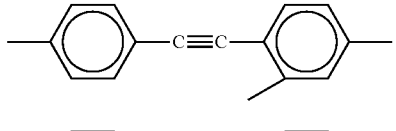
(13-3)
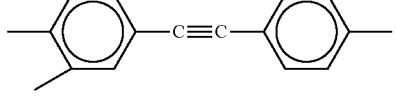
(13-4)

-continued

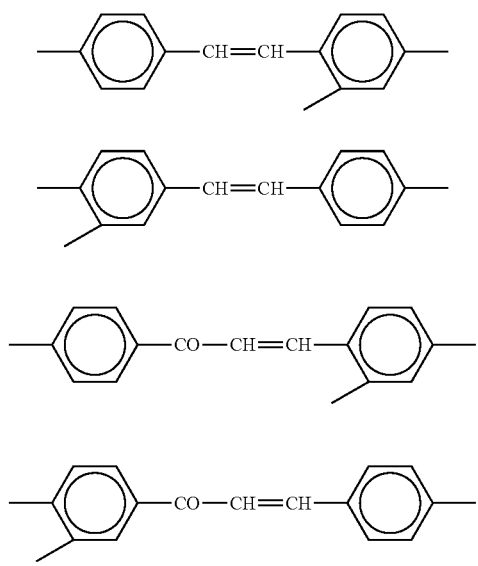

(13-5)
(13-6)
(13-7)
(13-8)

In each of formulas (8) and (9), the Side Chain may represent a monovalent group represented by any of the following formulas (14-1) to (14-8). These groups are for horizontal alignment films.

[Chem. 14]

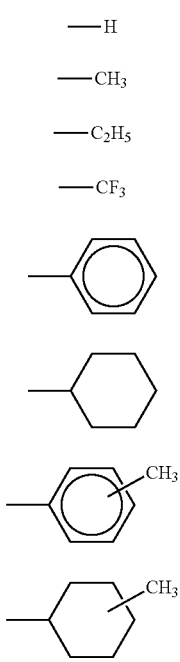

—H  (14-1)
—CH$_3$  (14-2)
—C$_2$H$_5$  (14-3)
—CF$_3$  (14-4)
(14-5)
(14-6)
(14-7)
(14-8)

In each of formulas (8) and (9), the Side Chain may represent a monovalent group represented by any of the following formulas (15-1) to (15-7). These groups are for vertical alignment films.

[Chem. 15]

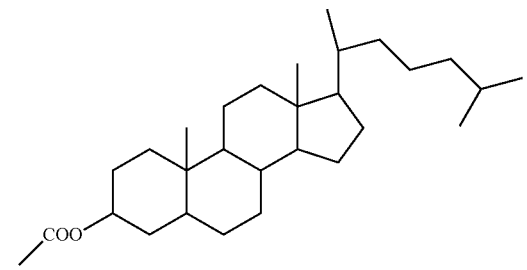

(15-1)
(15-2)

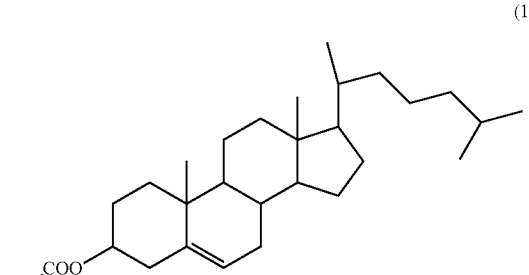

(15-3)
(15-4)

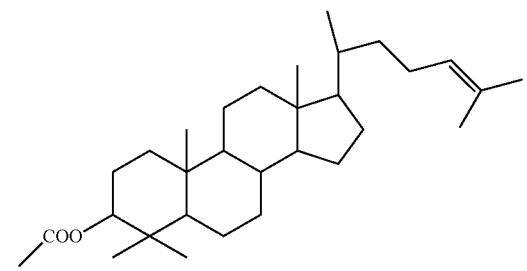

(15-5)
(15-6)
(15-7)

In each of formulas (8) and (9), the Side Chain may represent a monovalent group represented by the following formula (16-1) or (16-2). These groups are for horizontal photoalignment films.

[Chem. 16]
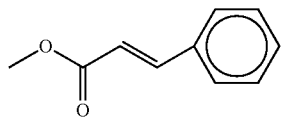
(16-1)
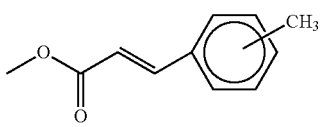
(16-2)
In each of formulas (8) and (9), the Side Chain may represent a monovalent group represented by any of the following formulas (17-1) to (17-21). These groups are for vertical photoalignment films.
[Chem. 17-1]
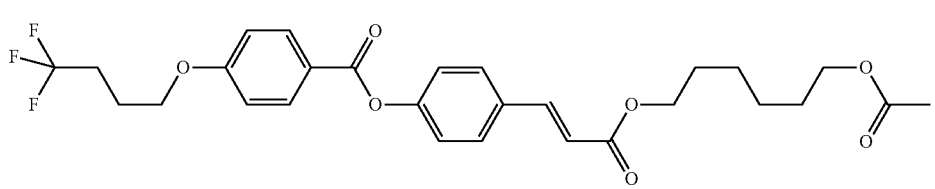
(17-1)
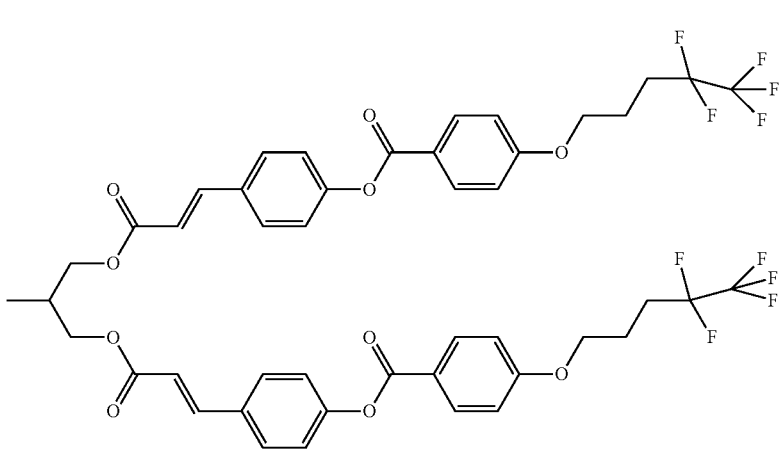
(17-2)
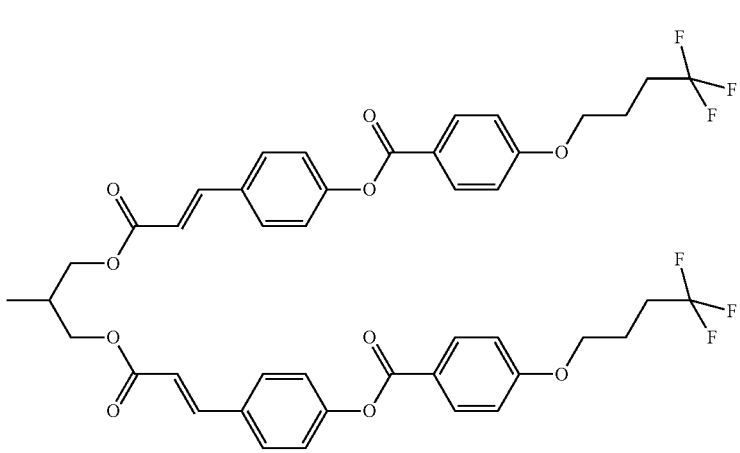
(17-3)

-continued
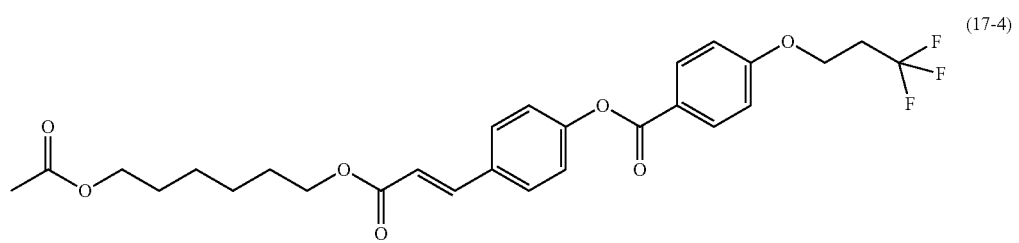
(17-4)
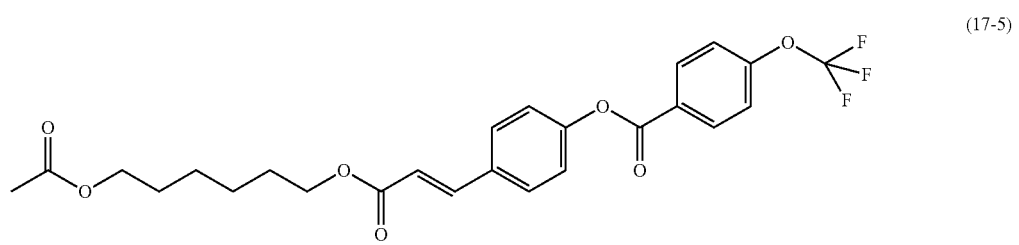
(17-5)
[Chem. 17-2]
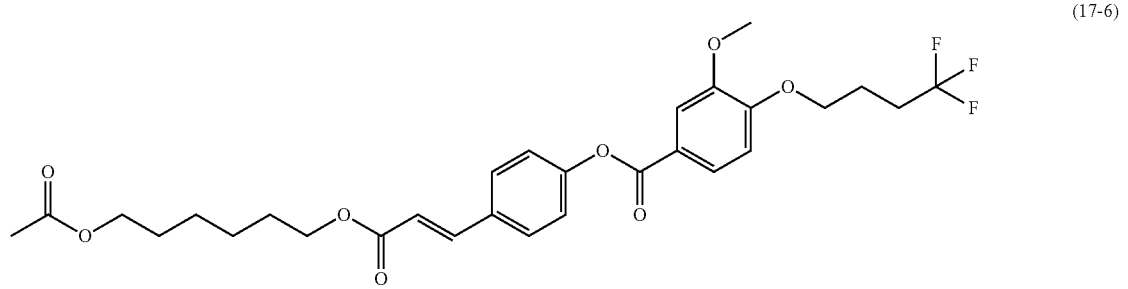
(17-6)
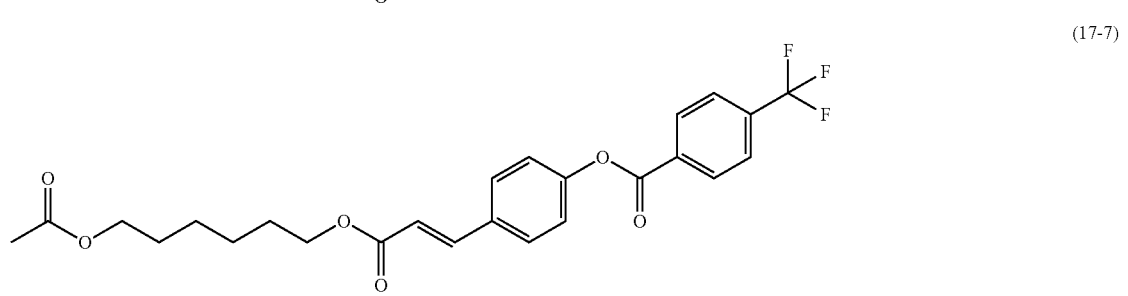
(17-7)
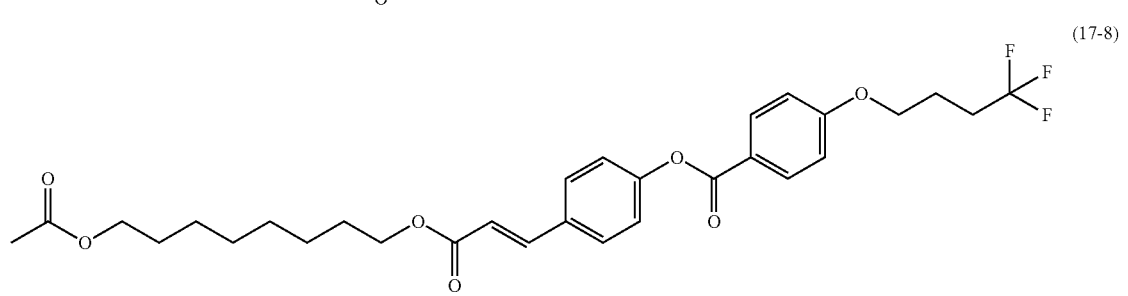
(17-8)
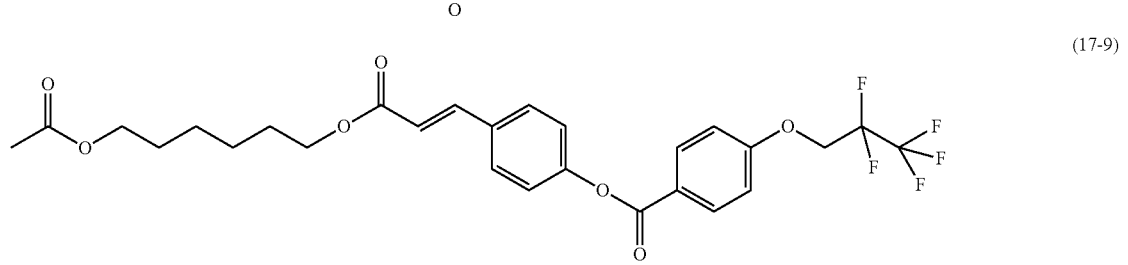
(17-9)

-continued
(17-10)
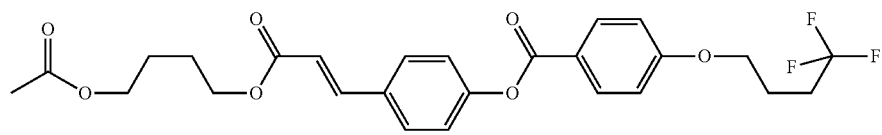
(17-11)
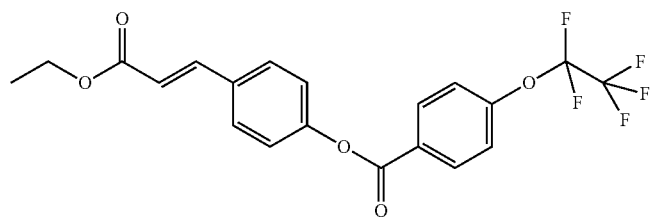
[Chem. 17-3]
(17-12)
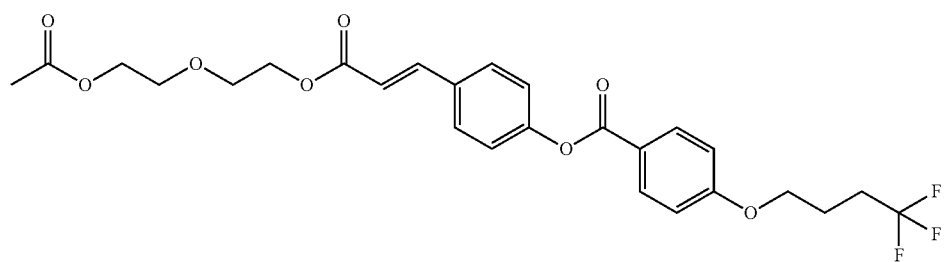
(17-13)
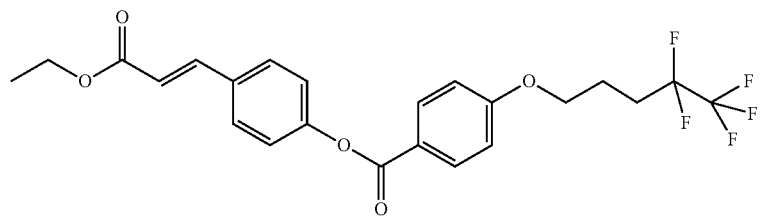
(17-14)
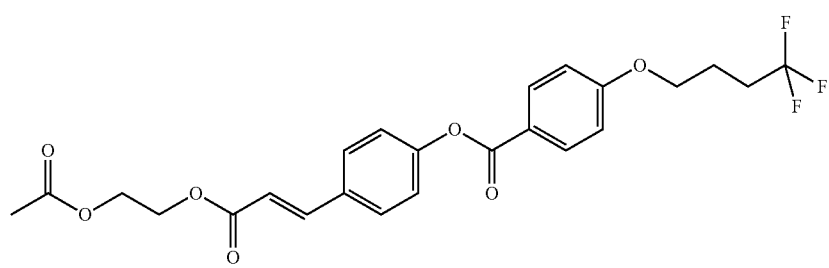
(17-15)
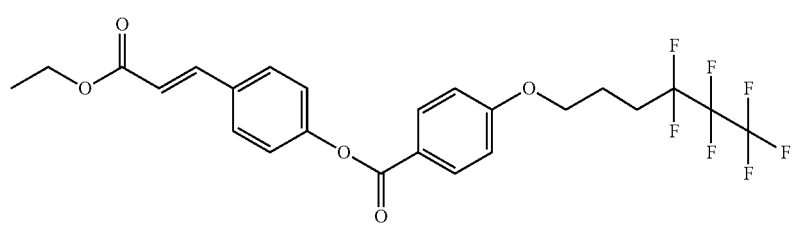
(17-16)
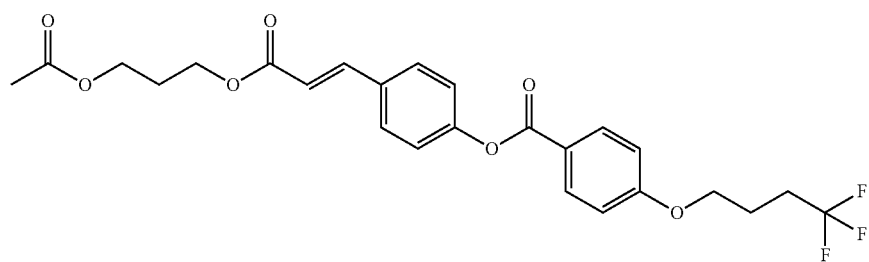

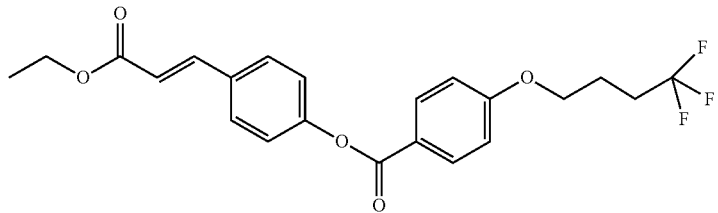
(17-17)

[Chem. 17-4]

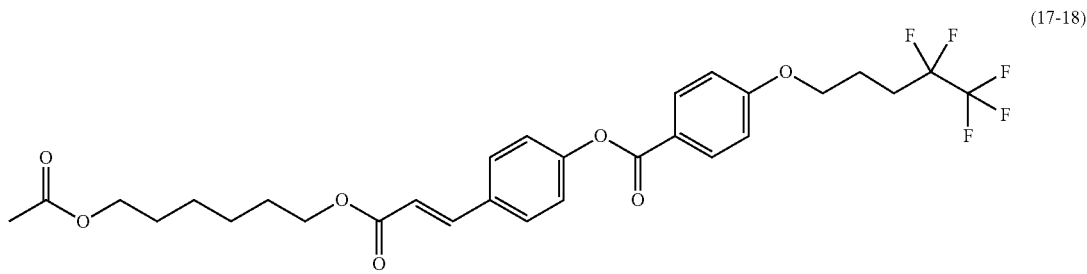
(17-18)

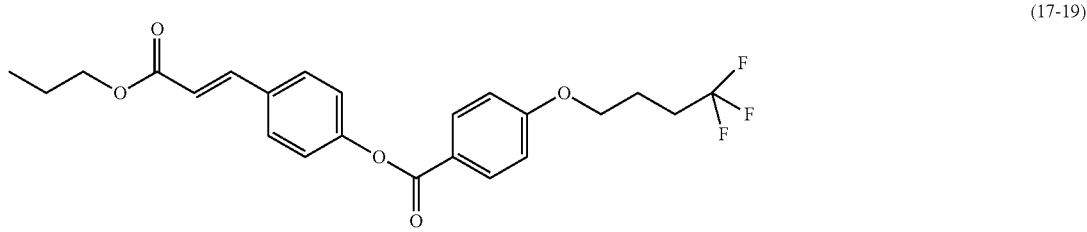
(17-19)

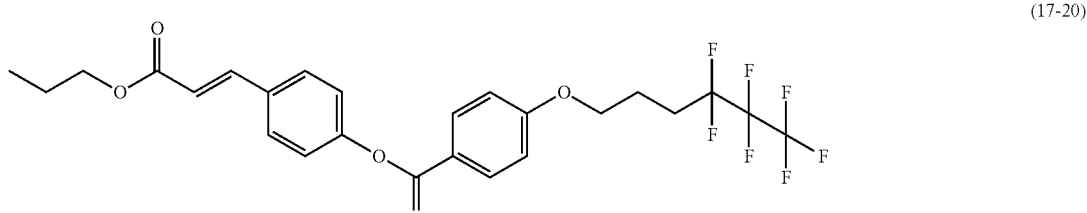
(17-20)

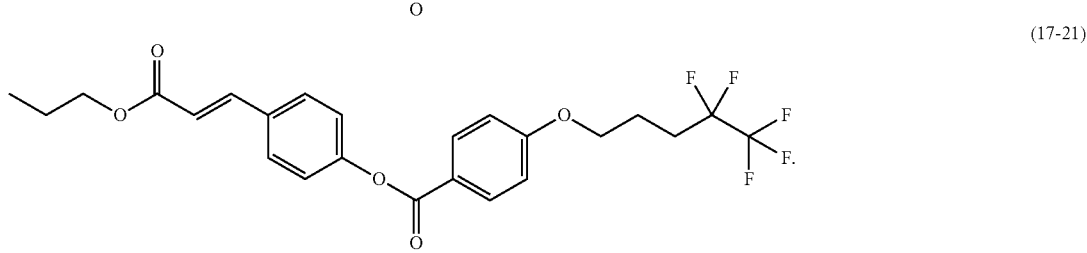
(17-21)

(Example 1) (Horizontal Alignment)

UV Sealant 1

A UV sealant 1 was prepared. The UV sealant 1 contains the radical polymerization initiator represented by formula (2), which generates radicals upon exposure to UV light (ultraviolet light), in an amount of 10 wt % of the total weight of the sealant. In addition to the radical polymerization initiator represented by formula (2), the sealant contains an acrylic resin (epoxy-modified) (EBECRYL3700 available from Daicel-Allnex Ltd., about 50 wt %), an epoxy resin (Epikote 806 available from Japan Epoxy Resins Co. Ltd., about 20 wt %), a hydrazide-based curing agent (dihydrazide adipate available from Otsuka Chemical Co., Ltd., about 10 wt %), an acrylic-epoxy resin, a silane coupling agent (KBM-403 available from Shin-Etsu Chemical Co., Ltd., about 0.2 wt %), an organic filler, and an inorganic filler (ADMAFINE S0-C2 available from Admatechs Company Limited) (the total amount of the organic filler and the inorganic filler is about 10 wt %). The mixing ratio of the resin components, curing agent, silane coupling agent, and filler is not particularly limited, and they may be mixed at a general ratio, for example. The sealant may or may not contain an acrylic-epoxy resin. The sealant may further contain a thermal radical polymerization initiator (e.g., V-30 available from Wako Pure Chemical Corporation). The amount of the thermal radical polymerization initiator is about 1 to 3 wt %, for example.

(Liquid Crystal Cell Production)

A substrate including an indium tin oxide (ITO) slit electrode and a substrate without an electrode were provided, and a polyimide-based horizontal alignment agent was applied to these substrates, followed by pre-baking at 90° C. for 5 minutes and then post-baking at 230° C. for 40 minutes. Subsequently, the surface of each substrate was subjected to alignment treatment by rubbing. The UV sealant 1 was applied to one of the substrates using a dispenser to obtain a sealing member width of 0.6 mm. A positive liquid crystal composition was dropped onto predetermined positions of the other substrate. Subsequently, these substrates were bonded to each other under vacuum, and the UV sealant 1 was cured by UV light. In order to cancel the liquid crystal flow alignment, a liquid crystal cell was heated at 130° C. for 40 minutes for realignment treatment to make the liquid crystal molecules have an isotropic phase. Then, the liquid crystal cell was cooled to room temperature. Thus, an IPS mode liquid crystal cell was obtained.

Comparative Example 1

As Comparative Example 1, an IPS mode liquid crystal cell was produced using the same sealant as in Example 1, except that Irgacure 651 (available from BASF) was used as a polymerization initiator instead of the radical polymerization initiator used in Example 1.
(Reliability Test)
In order to evaluate the light resistance of the liquid crystal cell, the voltage holding ratio (VHR) was measured before and after the liquid crystal cell was left on the 75° C. backlight for 5000 hours. In addition, in order to evaluate the moisture resistance, the VHR was measured before and after the liquid crystal cell was left at a temperature of 70° C. and a humidity of 90% for 5000 hours. The VHR was measured on an electrode at a distance 2 mm away from the sealing member at 1 V at 70° C., using a VHR measurement system (model 6254) available from TOYO Corporation. Table 1 shows the results.

TABLE 1

|  | 75° C. backlight test | | 70° C. + 90% humidity test | |
| --- | --- | --- | --- | --- |
|  | Initial VHR (%) | VHR (%) after 5000 hours of exposure | Initial VHR (%) | VHR (%) after 5000 hours of exposure |
| Example 1 | 99.5 | 99.5 | 99.5 | 97.0 |
| Comparative Example 1 | 99.5 | 99.0 | 99.5 | 93.0 |

(Light Resistance Test)
Results from the 75° C. backlight test show no decrease in the VHR after 5000 hours of exposure when the polymerization initiator having a silsesquioxane (SQ) group was used (Example 1). In contrast, the VHR slightly decreased when the polymerization initiator having no SQ group bonded thereto was used (Comparative Example 1). Presumably, the unreacted polymerization initiator dissolved into the liquid crystal layer because an SQ group was not bonded to the polymerization initiator, and the polymerization initiator dissolved into the liquid crystal layer generated radicals upon exposure to light of the backlight, resulting in a lower VHR. In contrast, presumably, bonding of an SQ group to the polymerization initiator inhibited dissolution of the unreacted polymerization initiator (when present) into the liquid crystal layer, resulting in no decrease in the VHR.
(Moisture Resistance Test)
Results from the 70° C.+90% humidity test also show that a decrease in the VHR after 5000 hours of exposure was smaller when the polymerization initiator having a silsesquioxane (SQ) group was used (Example 1) than when the polymerization initiator not having an SQ group bonded thereto was used (Comparative Example 1). Presumably, the sealing member allowed moisture to easily pass therethrough because an SQ group was not bonded to the polymerization initiator, thus causing moisture intrusion into the liquid crystal layer. In contrast, presumably, bonding of an SQ group to the polymerization initiator inhibited passage of moisture into the sealing member to some degree.

(Example 2) (Horizontal Photoalignment 1)

(UV-Vis Sealant 2)
An UV-Vis sealant 2 was prepared. The UV-Vis sealant 2 contains the radical polymerization initiator represented by formula (4), which generates radicals upon exposure to either UV light or visible light, in an amount of 10 wt % of the total weight of the sealant. In addition to the radical polymerization initiator represented by formula (4), the sealant contains an acrylic resin (epoxy-modified), an epoxy resin, an amine-based curing agent, an acrylic-epoxy resin, a silane coupling agent, a photosensitizer, an organic filler, and an inorganic filler. The components of the sealant of Example 2 other than the radical polymerization initiator are the same as those of the sealant of Example 1.
(Liquid Crystal Cell Production)
A substrate including an ITO slit electrode and a substrate without an electrode were provided, and a mixed alignment agent of a polyamic acid-based horizontal photoalignment agent (photofunctional group: azobenzene) and a polyamic acid-based horizontal alignment agent without a photoalignment group was applied to these substrates, followed by pre-baking at 90° C. for 5 minutes and then post-baking at 230° C. for 40 minutes. Subsequently, the surface of each substrate was subjected to alignment treatment by rubbing. The UV-Vis sealant 2 was applied to one of the substrates using a dispenser to obtain a sealing member width of 0.6 mm. A negative liquid crystal composition was dropped onto predetermined positions of the other substrate. Subsequently, these substrates were bonded to each other under vacuum, and the UV-Vis sealant 2 was cured by light having a wavelength of 380 to 420 nm. In order to cancel the liquid crystal flow alignment, a liquid crystal cell was heated at 130° C. for 40 minutes for realignment treatment to make the liquid crystal molecules have an isotropic phase. Then, the liquid crystal cell was cooled to room temperature. Thus, an FFS mode liquid crystal cell was obtained.

Comparative Example 2

As Comparative Example 2, an FFS mode liquid crystal panel was produced using the same sealant as in Example 2, except that a compound represented by the following formula (18) was used as a polymerization initiator instead of the radical polymerization initiator used in Example 2.

[Chem. 18]

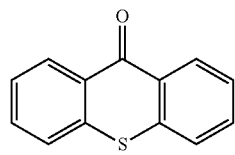

(18)

(Reliability Test)

The same test as in Example 1 was performed. Table 2 shows the results.

TABLE 2

|  | 75° C. backlight test | | 70° C. + 90% humidity test | |
| --- | --- | --- | --- | --- |
|  | Initial VHR (%) | VHR (%) after 5000 hours of exposure | Initial VHR (%) | VHR (%) after 5000 hours of exposure |
| Example 2 | 99.5 | 96.4 | 99.5 | 94.5 |
| Comparative Example 2 | 99.5 | 89.3 | 99.5 | 90.0 |

(Light Resistance Test)

Results from the 75° C. backlight test show that a decrease in the VHR after 5000 hours of exposure was smaller when the polymerization initiator having a silsesquioxane (SQ) group was used (Example 2) than when the polymerization initiator not having an SQ group bonded thereto was used (Comparative Example 2). Presumably, the unreacted polymerization initiator dissolved into the liquid crystal layer due to degradation of the photoalignment film by light of the backlight and generation of impurities and also because an SQ group was not bonded to the polymerization initiator, and the polymerization initiator dissolved into the liquid crystal layer generated radicals upon exposure to light of the backlight, resulting in a lower VHR. In contrast, presumably, bonding of an SQ group to the polymerization initiator inhibited dissolution of the unreacted polymerization initiator (when present) into the liquid crystal layer, thus relatively minimizing the decrease in the VHR.

(Humidity Resistance Test)

Results from the 70° C.+90% humidity test also show that a decrease in the VHR after 5000 hours of exposure was smaller when the polymerization initiator having a silsesquioxane (SQ) group was used (Example 2) than when the polymerization initiator not having an SQ group bonded thereto was used (Comparative Example 2). Presumably, the sealing member allowed moisture to easily pass therethrough because an SQ group was not bonded to the polymerization initiator, thus causing moisture intrusion into the liquid crystal layer. In contrast, presumably, bonding of an SQ group to the polymerization initiator inhibited passage of moisture into the sealing member to some degree.

(Example 3-1) (Horizontal Photoalignment 2)

(UV-Vis Sealant 3)

An UV-Vis sealant 3 was prepared. The UV-Vis sealant 3 contains the radical polymerization initiator represented by formula (5), which generates radicals upon exposure to either UV light or visible light, in an amount of 5 wt % of the total weight of the sealant. In addition to the radical polymerization initiator represented by formula (5), the UV-Vis sealant 3 contains an acrylic resin (epoxy-modified), an epoxy resin, an amine-based curing agent, an acrylic-epoxy resin, a silane coupling agent, an organic filler, and an inorganic filler.

(Liquid Crystal Cell Production)

A substrate including an ITO slit electrode and a substrate without an electrode were provided. A mixed alignment agent of a polyamic acid-based horizontal alignment agent without a photoalignment group and a horizontal photoalignment agent (photofunctional group: cinnamate) containing a polysiloxane polymer represented by formula (6) wherein m is 0.5, α is a methoxy group, and β1 is a group represented by formula (7-2) was applied to the substrates, followed by pre-baking at 90° C. for 5 minutes and then post-baking at 230° C. for 40 minutes. Subsequently, the surface of each alignment film substrate was subjected to alignment treatment by irradiation with polarized light. The UV-Vis sealant 3 was applied to one of the substrates using a dispenser to obtain a sealing member width of 0.6 mm. A negative liquid crystal composition was dropped onto predetermined positions of the other substrate. Subsequently, these substrates were bonded to each other under vacuum, and the UV-Vis sealant 3 was cured by light having a wavelength of 380 to 420 nm. In order to cancel the liquid crystal flow alignment, a liquid crystal cell was heated at 130° C. for 40 minutes for realignment treatment to make the liquid crystal molecules have an isotropic phase. Then, the liquid crystal cell was cooled to room temperature. Thus, an FFS mode liquid crystal cell was obtained.

Example 3-2

In Example 3-2, an FFS mode liquid crystal panel was produced using a photoalignment film, as an alignment film instead of the alignment film used in Example 3-1. The photoalignment film contained an alignment agent mixture of a polyamic acid-based horizontal alignment agent without a photoalignment group and a polyamic acid-based photoalignment agent (photofunctional group: cinnamate) represented by formula (8) wherein X is a group represented by formula (10-5), Y is a group represented by formula (12-2), and the Side Chain is a group represented by formula (16-2).

(Reliability Test)

The same test as in Example 1 was performed. Table 3 shows the results.

TABLE 3

|  | 75° C. backlight test | | 70° C. + 90% humidity test | |
| --- | --- | --- | --- | --- |
|  | Initial VHR (%) | VHR (%) after 5000 hours of exposure | Initial VHR (%) | VHR (%) after 5000 hours of exposure |
| Example 3-1 | 99.1 | 95.8 | 99.1 | 96.2 |
| Example 3-2 | 99.2 | 95.5 | 99.2 | 94.3 |

(Light Resistance Test)

Results from the 75° C. backlight test show that a decrease in the VHR after 5000 hours of exposure was comparable between when a sealing member containing a polymerization initiator having a silsesquioxane (SQ) group and a polysiloxane-based photoalignment film were used in combination (Example 3-1) and when a sealing member containing a polymerization initiator having a silsesquioxane (SQ) group and a polyamic acid-based photoalignment film were used in combination (Example 3-2), and the decrease in the VHR was relatively small in both examples. Presumably, bonding of an SQ group to the polymerization initiator in the sealant inhibited dissolution of the unreacted polymerization initiator (when present) into the liquid crystal layer, thus relatively minimizing the decrease in the VHR.

(Moisture Resistance Test)

Results from the 70° C.+90% humidity test show that a decrease in the VHR after 5000 hours of exposure was smaller when the sealing member containing a polymerization initiator having a silsesquioxane (SQ) group and a polysiloxane-based photoalignment film were used in combination (Example 3-1) than when a sealing member containing a polymerization initiator having an SQ group and a polyamic acid-based photoalignment film was used in combination (Example 3-2). Presumably, owing to high compatibility between the SQ group and a polysiloxane, moisture intrusion from the interface between the sealing member and the alignment film was also effectively inhibited.

(Example 4-1) (Vertical Photoalignment)

(Liquid Crystal Cell Production)

A pair of substrates including an ITO electrode was provided, and a vertical photoalignment agent (photofunctional group: cinnamate) containing a mixed alignment agent of a polyamic acid-based horizontal alignment agent without a photoalignment group and a polysiloxane polymer represented by formula (6) wherein m is 0.5, α is a methoxy group, and β1 is a group represented by formula (7-3) was applied to the ITO substrates, followed by pre-baking at 90° C. for 5 minutes and then post-baking at 230° C. for 40 minutes. Subsequently, the surface of each alignment film substrate was subjected to alignment treatment by irradiation with polarized light. The UV-Vis sealant 3 was applied to one of the substrates using a dispenser to obtain a sealing member width of 0.5 mm. A negative liquid crystal composition was dropped onto predetermined positions of the other substrate. Subsequently, these substrates were bonded to each other under vacuum, and the UV-Vis sealant 3 was cured by light having a wavelength of 380 to 420 nm. In order to cancel the liquid crystal flow alignment, a liquid crystal cell was heated at 130° C. for 40 minutes for realignment treatment to make the liquid crystal molecules have an isotropic phase. Then, the liquid crystal cell was cooled to room temperature. Thus, a vertical alignment (RTN) mode liquid crystal cell was obtained.

Example 4-2

In Example 4-2, a vertical alignment (RTN) mode liquid crystal panel was produced using a photoalignment film, as an alignment film instead of the alignment film used in Example 4-1. The photoalignment film contained an alignment agent mixture of a polyamic acid-based vertical alignment agent without a photoalignment group and a polyamic acid-based photoalignment agent (photofunctional group: cinnamate) represented by formula (8) wherein X is a group represented by formula (10-5), Y is a group represented by formula (12-2), and the Side Chain is a group represented by formula (17-14).

(Reliability Test)

The same test as in Example 1 was performed. Table 4 shows the results.

TABLE 4

|  | 75° C. backlight test | | 70° C. + 90% humidity test | |
| --- | --- | --- | --- | --- |
|  | Initial VHR (%) | VHR (%) after 5000 hours of exposure | Initial VHR (%) | VHR (%) after 5000 hours of exposure |
| Example 4-1 | 99.4 | 96.5 | 99.4 | 97.0 |
| Example 4-2 | 99.4 | 96.5 | 99.4 | 94.9 |

(Light Resistance Test)

Results from the 75° C. backlight test show that a decrease in the VHR after 5000 hours of exposure was comparable between when a sealing member containing a polymerization initiator having a silsesquioxane (SQ) group and a polysiloxane-based photoalignment film (vertical photoalignment film) were used in combination (Example 4-1) and when a sealing member containing a polymerization initiator having a silsesquioxane (SQ) group and a polyamic acid-based photoalignment film (vertical photoalignment film) were used in combination (Example 4-2), and the decrease in the VHR was relatively small in these examples. Presumably, bonding of an SQ group to the polymerization initiator in the sealant inhibited dissolution of the unreacted polymerization initiator (when present) into the liquid crystal layer, thus relatively minimizing the decrease in the VHR.

(Moisture Resistance Test)

Results from the 70° C.+90% humidity show that a decrease in the VHR after 5000 hours of exposure was smaller when the sealing member containing a polymerization initiator having a silsesquioxane (SQ) group and a polysiloxane-based photoalignment film (vertical photoalignment film) were used in combination (Example 4-1) than when a sealing member containing a polymerization initiator having an SQ group and a polyamic acid-based photoalignment film (vertical photoalignment film) was used in combination (Example 4-2). Presumably, owing to high compatibility between the SQ group and a polysiloxane, moisture intrusion from the interface between the sealing member and the alignment film was also effectively inhibited.

[Additional Remarks]

Examples of preferred aspects of the sealant for sealing liquid crystal and the liquid crystal display device of the present invention are listed below. These examples may be appropriately combined without departing from the gist of the present invention.

As long as the sealant for sealing liquid crystal of the present invention contains a curable resin and a radical polymerization initiator and the radical polymerization initiator contains a silsesquioxane group, the sealant for sealing liquid crystal can exert the effects of the present invention by preventing the radical polymerization initiator from dissolving into the liquid crystal layer and the sealant from absorbing moisture. Thus, as for other features of the sealant for sealing liquid crystal of the present invention, any conventionally known features can be suitably employed.

In the sealant for sealing liquid crystal of the present invention, the silsesquioxane group is preferably a group represented by the following formula (I) or (II):

[Chem. 19]

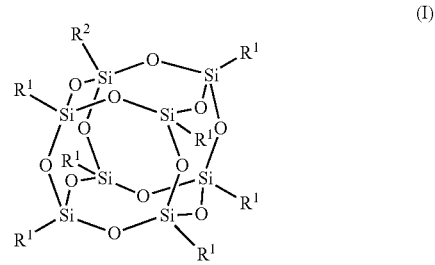

(I)

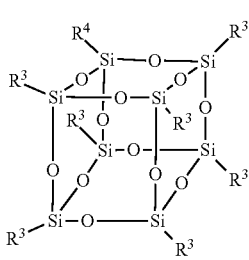
(II)

wherein R¹s are the same as or different from each other and each represent a monovalent organic group; R² represents a divalent linking group; R³s are the same as or different from each other and each represent a monovalent organic group; and R⁴ represents a divalent linking group.

The R¹s each preferably represent an alkyl group, an alkenyl group, a substituted or unsubstituted aryl group, a substituted or unsubstituted arylalkyl group, a substituted or unsubstituted arylalkenyl group, or a substituted or unsubstituted phenyl group. Yet, in the alkyl group, the alkenyl group, the alkylene group in the arylalkyl group, the alkenylene group in the arylalkenyl group, and the phenyl group, one or more hydrogen atoms may be replaced by fluorine atoms, and one or more —CH$_2$— may be replaced by —O—. R³s each preferably represent an alkyl group, an alkenyl group, a substituted or unsubstituted aryl group, a substituted or unsubstituted arylalkyl group, a substituted or unsubstituted arylalkenyl group, or a substituted or unsubstituted phenyl group. Yet, in the alkyl group, the alkenyl group, the alkylene group in the arylalkyl group, the alkenylene group in the arylalkenyl group, and the phenyl group, one or more hydrogen atoms may be replaced by fluorine atoms, and one or more —CH$_2$— may be replaced by —O—. In particular, R¹s and R³s each preferably represent an aromatic functional group.

In the sealant for sealing liquid crystal of the present invention, the R² and R⁴ each preferably represent any of the following formulas (III) to (XI):

[Chem. 20]

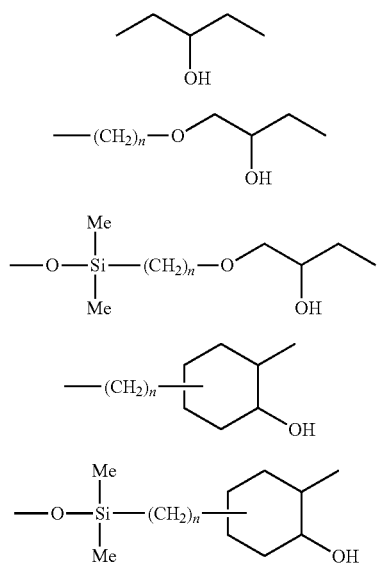

(III)

(IV)

(V)

(VI)

(VII)

-continued

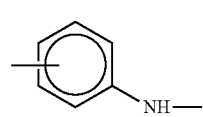

(VIII)

—(CH$_2$)$_n$—NH— (IX)

(X)

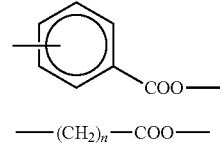

—(CH$_2$)$_n$—COO— (XI)

wherein n represents an integer of 1 to 16; and Me represents a methyl group.

The curable resin preferably contains a (meth)acrylic resin and/or an epoxy resin.

The sealant for sealing liquid crystal of the present invention preferably further contains a silane coupling agent.

The radical polymerization initiator preferably contains at least one selected from the group consisting of an acetophenone skeleton, a benzophenone skeleton, a benzyl group, a thioxanthone skeleton, a benzoyl ether skeleton, and a camphorquinone skeleton. Herein, the acetophenone skeleton is not limited as long as it has a structure in which one or more hydrogen atoms are separated from acetophenone. The same shall apply to the benzophenone skeleton, thioxanthone skeleton, benzoyl ether skeleton, and camphorquinone skeleton.

The radical polymerization initiator preferably contains a functional group represented by the following formula (XII):

[Chem. 21]

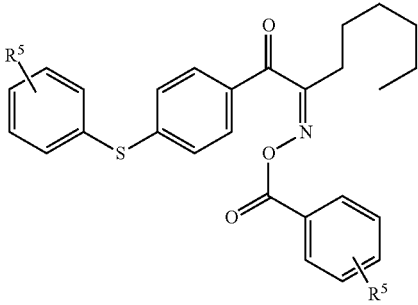

(XII)

wherein R⁵s are the same as or different from each other and each represent a hydrogen atom or a divalent linking group, and at least one R⁵ represents a divalent linking group.

The sealant for sealing liquid crystal of the present invention preferably contains the radical polymerization initiator, for example, in an amount of 0.1 to 15% by mass in 100% by mass of the sealant.

The liquid crystal display device of the present invention may include: a pair of substrates; a liquid crystal layer disposed between the substrates; an alignment film disposed between at least one substrate and the liquid crystal layer; a sealing member disposed between the substrates at the periphery of these substrates so as to seal the liquid crystal layer; and a backlight, wherein the sealing member is a cured product of the sealant for sealing liquid crystal.

In the liquid crystal display device of the present invention, the sealing member preferably has an average width of 0.6 mm or less.

In the liquid crystal display device of the present invention, the alignment film preferably contains a polymer whose main chain is a polysiloxane.

In the liquid crystal display device of the present invention, the alignment film is preferably a photoalignment film.

The photoalignment film preferably contains at least one photofunctional group selected from the group consisting of a cinnamate group, a coumarin group, a stilbene group, an azobenzene group, and a chalcone group. The photofunctional group is preferably incorporated into a polymer whose main chain is a polysiloxane.

In one preferred embodiment of the liquid crystal display device of the present invention, the alignment film aligns liquid crystal molecules in the liquid crystal layer in a substantially horizontal direction.

In one preferred embodiment of the liquid crystal display device of the present invention, the alignment film aligns liquid crystal molecules in the liquid crystal layer in a substantially vertical direction.

The alignment film is preferably formed from a combination of two or more polymers.

The display mode of the liquid crystal display device is preferably a twisted nematic (TN) mode, an electrically controlled birefringence (ECB) mode, an IPS mode, an FFS mode, a VA mode, or a VATN mode.

The present invention also relates to a method for producing a liquid crystal display device, the method including the steps of: forming an alignment film on each of two substrates; applying the sealant for sealing liquid crystal of the present invention to one substrate; dropping a liquid crystal composition onto the other substrate; bonding the substrates to each other; curing a sealant for sealing liquid crystal; and disposing a backlight on the back side of the substrates.

REFERENCE SIGNS LIST

11: lower glass substrate
13, 23: alignment film
21: upper glass substrate
31: liquid crystal layer
33: sealing member
41: backlight

The invention claimed is:

1. A liquid crystal display device comprising:
a pair of substrates;
a liquid crystal layer disposed between the substrates;
an alignment film disposed between at least one of the substrates and the liquid crystal layer;
a sealing member disposed between the substrates at the periphery of these substrates so as to seal the liquid crystal layer; and
a backlight,
wherein the sealing member is a cured product of a sealant for sealing liquid crystal, the sealant including:
a curable resin; and
a radical polymerization initiator,
wherein the radical polymerization initiator contains a silsesquioxane group,
wherein the radical polymerization initiator contains a functional group represented by the following formula (XII):

[Chem. 1]

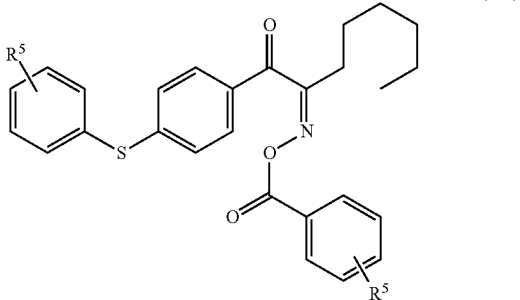

(XII)

wherein $R^5$s are the same as or different from each other and each represent a hydrogen atom or divalent linking group, and at least one $R^5$ represents a divalent linking group,
wherein the silsesquioxane group is a group represented by the following formula (I),

[Chem. 2]

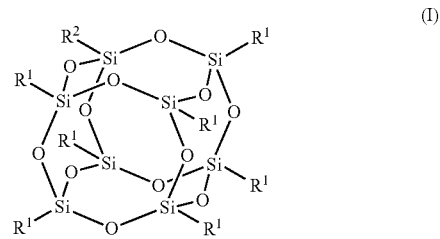

(I)

wherein $R^1$s are the same as or different from each other and each represent a monovalent organic group; and $R^2$ represents a divalent linking group.

2. The liquid crystal display device according to claim 1, wherein the sealing member has an average width of 0.6 mm or less.

3. The liquid crystal display device according to claim 1, wherein the alignment film contains a polymer whose main chain is a polysiloxane.

4. The liquid crystal display device according to claim 1, wherein the alignment film is a photoalignment film.

5. The liquid crystal display device according to claim 4, wherein the photoalignment film contains at least one photofunctional group selected from the group consisting of a cinnamate group, a coumarin group, a stilbene group, an azobenzene group, and a chalcone group.

6. The liquid crystal display device according to claim 1, wherein the alignment film aligns liquid crystal molecules in the liquid crystal layer in a substantially horizontal direction.

7. The liquid crystal display device according to claim 1, wherein the alignment film aligns liquid crystal molecules in the liquid crystal layer in a substantially vertical direction.

8. The liquid crystal display device according to claim 1, wherein the display mode of the liquid crystal display device is a TN mode, an ECB mode, an IPS mode, an FFS mode, a VA mode, or a VATN mode.

* * * * *